United States Patent [19]

McCormick

[11] 4,079,949
[45] Mar. 21, 1978

[54] INTEGRAL SPRING PISTON RING

[75] Inventor: Harold E. McCormick, Ballwin, Mo.

[73] Assignee: Ramsey Corporation, St. Louis, Mo.

[21] Appl. No.: 684,920

[22] Filed: May 10, 1976

[51] Int. Cl.² .............................................. F16J 9/06
[52] U.S. Cl. ..................................... 277/138; 277/200
[58] Field of Search ............... 277/138, 139, 140, 141, 277/200

[56] References Cited

U.S. PATENT DOCUMENTS

| 1,288,085 | 12/1918 | McGinniss | 277/138 |
| 2,311,557 | 2/1943 | Mason | 277/159 |
| 2,720,435 | 10/1955 | Hamm | 277/138 |
| 3,326,561 | 6/1967 | Braendel | 277/138 |
| 3,677,558 | 7/1972 | Sugahara | 277/138 |

OTHER PUBLICATIONS

New Developments in Piston Rings for the Modern Diesel Engine by H. E. McCormack et al., presented at the 1975 SAE Off-Highway Vehicle Meeting, Milwaukee, Wisconsin, Sept. 8-11, 1975.

Primary Examiner—Robert I. Smith

[57] ABSTRACT

A one-piece annular oil control piston ring for internal combustion engines is adapted to be received with a peripheral groove in a piston. The ring is of generally U-shaped cross section defined by a pair of opposed sidewalls which project inwardly of the ring from a central peripheral wall thereof. A pair of scraper rims projects outwardly of the ring from the outer face of the peripheral wall. Spring members are cut from the peripheral wall and project between the sidewalls inwardly of the ring a distance sufficiently inwardly of the sidewall edges to enable the spring members to engage the back wall of the piston groove in which the ring is disposed. The spring action of the spring members biases the piston ring outwardly of the groove so that the scraping rims are maintained in scraping engagement with the cylinder walls.

11 Claims, 10 Drawing Figures

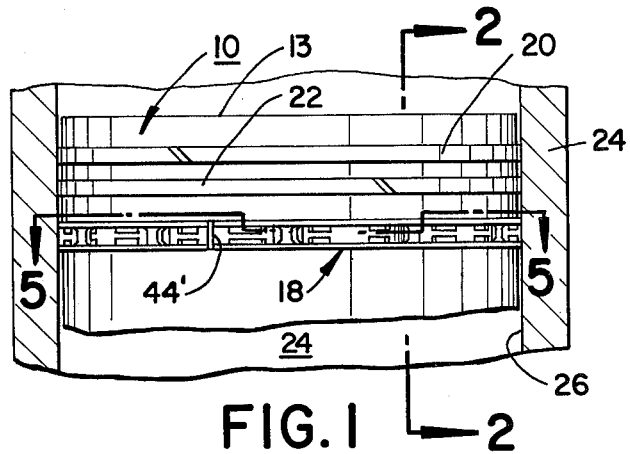
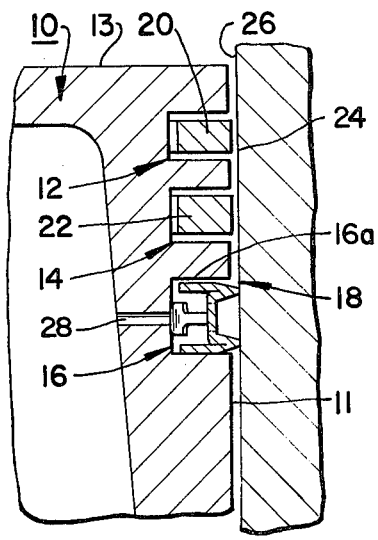
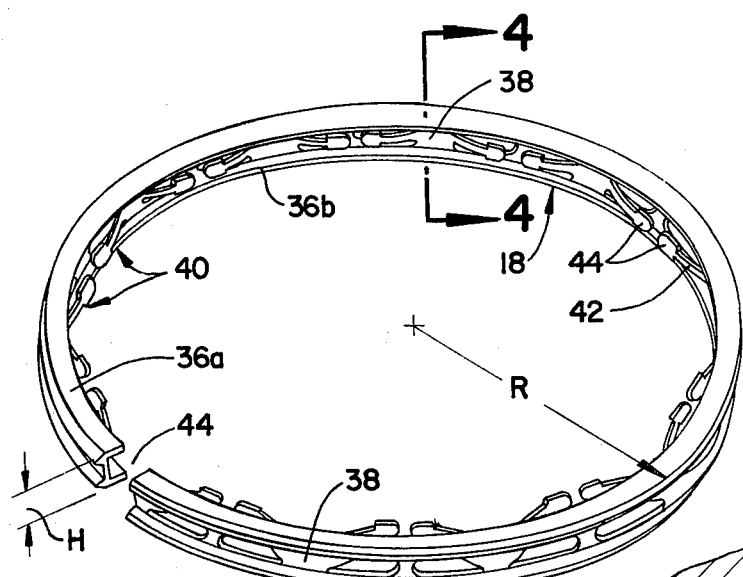
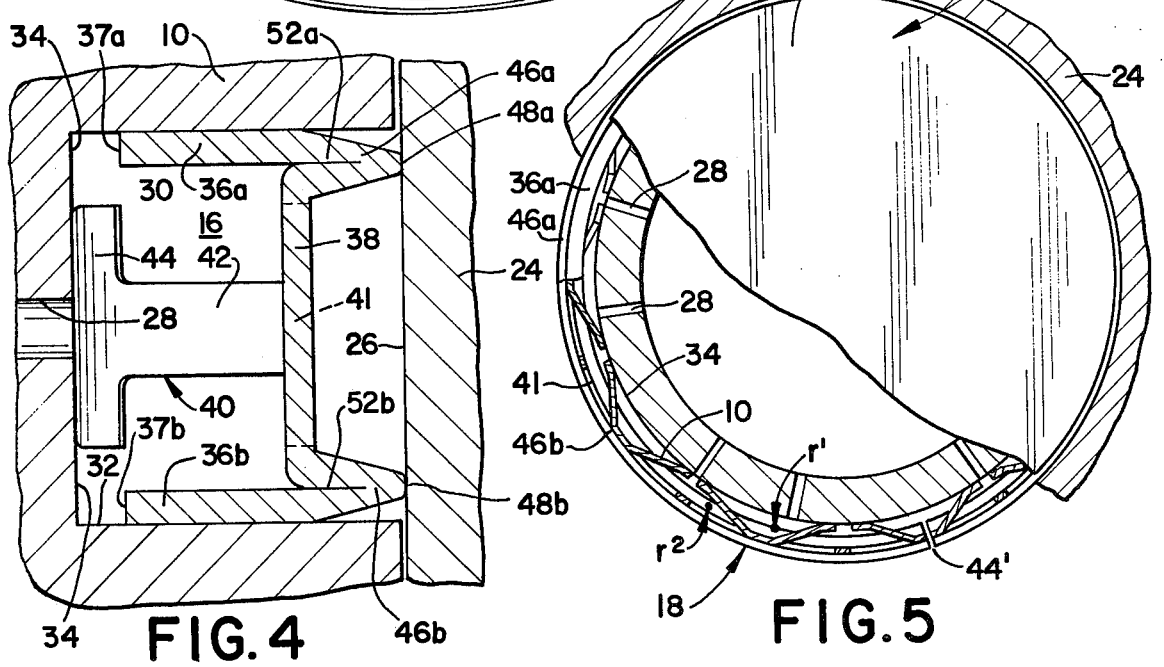
FIG. 1
FIG. 2
FIG. 3
FIG. 4
FIG. 5

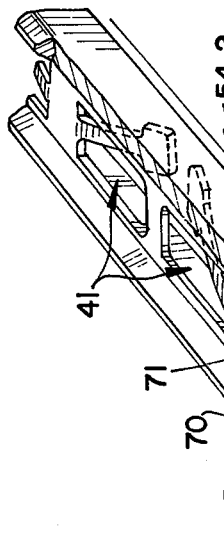
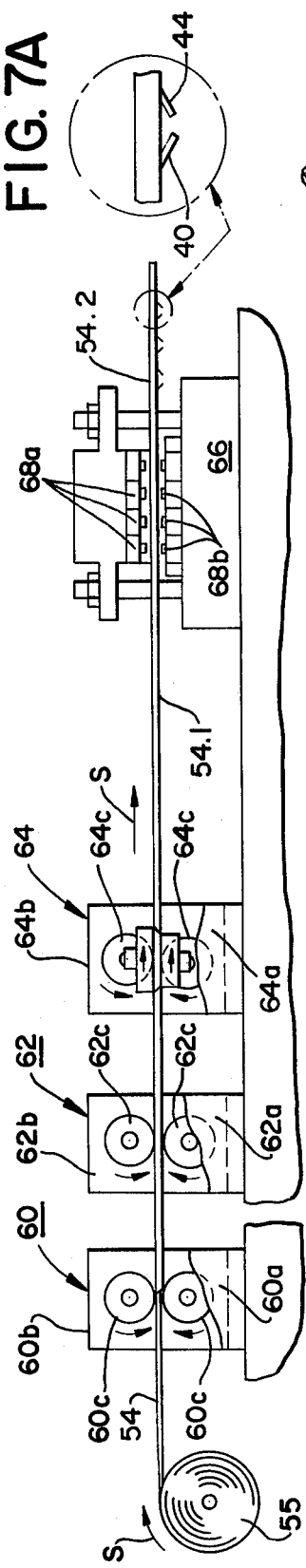
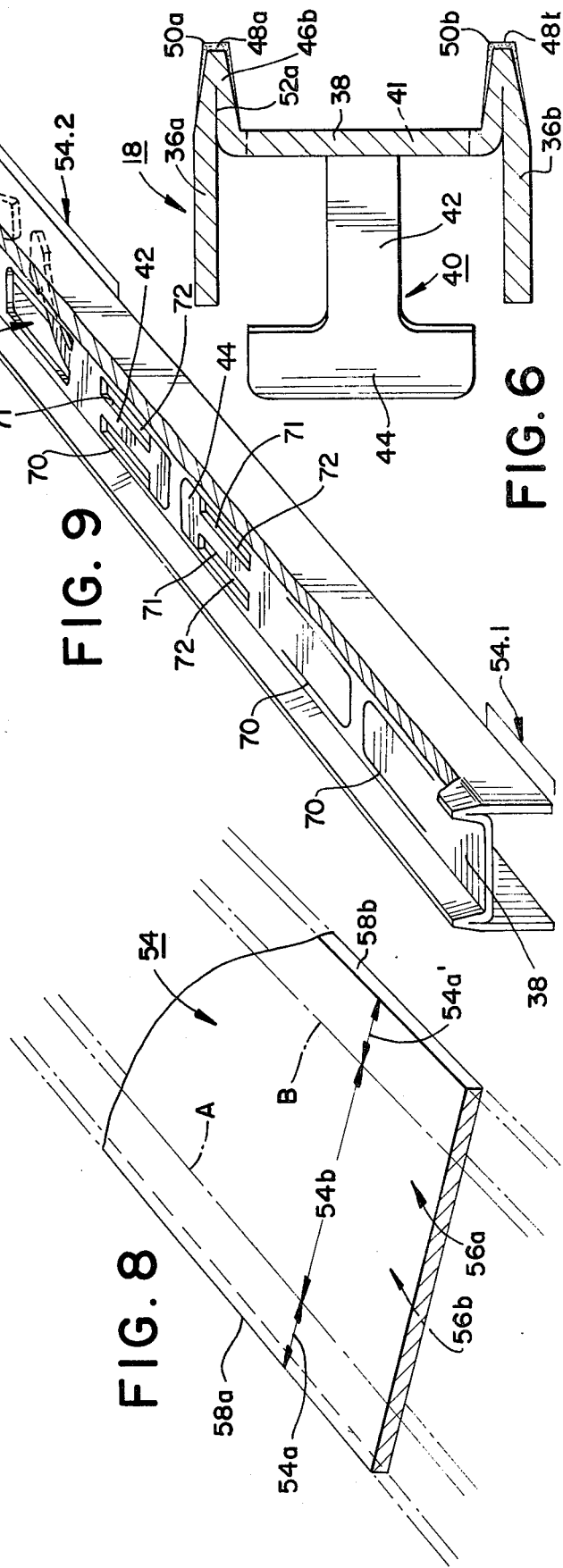

INTEGRAL SPRING PISTON RING

RELATED APPLICATIONS

This application is related to applications Ser. Nos. 672,571 and 672,752, filed Apr. 1, 1976, and assigned to the assignee of the present invention.

BACKGROUND OF THE INVENTION

The present invention is concerned with piston rings for internal combustion engines, particularly with oil control rings. More specifically, the present invention is concerned with a one-piece oil control ring adapted to be received within a peripheral groove formed in the piston of an internal combustion engine. The oil control ring of the invention, like oil control rings in general, provides one or more scraper rims whose function is to scrapingly engage the cylinder wall to control the distribution of oil thereon.

Such oil control rings in general comprise split annular, generally circular rings. The prior art shows some rings of generally U-shaped cross section having scraper rims on the outer peripheral face thereof and sidewalls projecting inwardly of the ring and within or against which are received the projecting legs of an expander spring which serves to provide the outward bias necessary for proper functioning of the ring. The U-shaped ring and the expander spring are separate components of a two-component assembly.

Such two-component assembly is shown, for example, in U.S. Pat. No. 3,606,359, assigned to the assignee of this application, and is illustrated in FIG. 4 thereof.

The prior art also shows three component oil scraper ring assemblies. One such is shown in FIG. 5 of the aforesaid U.S. Pat. No. 3,606,359. In this type of prior art arrangement a pair of split annular, circular flat rail rings are engaged with a generally U-shaped expander ring which engages the rail rings and urges them outwardly of the groove in scraping engagement with the cylinder.

It is also known to utilize an expander spring which itself provides an edge serving as a scraper rim against the wall of the cylinder, as well as serving to engage a rail ring in scraping engagement with the cylinder wall. Such an arrangement is shown in U.S. Pat. No. 3,628,800 also assigned to the assignee of this application.

Numerous other prior art arrangements of two and three piece oil control assembly rings are shown, for example, in U.S. Pat. Nos. 2,635,022, 2,744,803 (assigned to the assignee of this application), 3,140,096 and 3,384,383.

Generally, two-component oil control ring assemblies are utilized in medium duty gasoline and diesel truck engines. In high temperature, severe environment of such engines, three-component assemblies are subject to being stuck together by lacquer-like residues formed from combustion of the fuel and lubricants, which lacquer tends to misalign the components resulting in poor performance.

Three-component oil control ring assemblies are normally used in passenger car gasoline engines, in which the less severe conditions ameliorate the sticking problem.

At the other extreme of engine power, light duty gasoline engines such as those used on snow blowers, gasoline powered lawn mowers, etc. are also subject to the sticking problem resulting in misalignment of the components.

A number of problems are encountered by such multi-component assembly rings. One problem is production difficulties encountered in assembling the several components of the ring assembly into properly aligned and interengaging relationship with each other within the groove of a piston. The advantage of a single piece or unitary assembly in this respect is obvious. The unitary oil control ring assembly of the invention is believed to be most advantageously employed in light duty gasoline engines such as used in powered lawn mowers, snow blowers etc., but its use is not limited thereto.

A second problem with multi-component ring assemblies is that in operation of the engine proper alignment and engagement of the components with each other may be lost. For example, under the stress of operation in which high inertial forces are imposed on the ring assembly and with wear of the parts, there is a tendency for rail rings to tilt out of position or to otherwise shift so that the most effective oil scraping action is lost.

Finally, it will be appreciated that a manufacturing sequence which admits of producing what may be termed an oil control ring "assembly" in a unitary piece, has manufacturing advantages over the production, stocking and assembly of separate parts.

It is accordingly an object of the present invention to provide a unitary, i.e., one-piece, oil scraper ring which provides one or more scraper rims and biasing means and may therefore be termed a unitary oil control ring assembly.

It is another object of the present invention to provide an oil scraper ring which is economically manufactured and which has characteristics of rigidity and dimensional accuracy which provides excellent oil scraping performance.

Unitary compression piston rings, but not oil control rings, having integral spring fingers cut therefrom are known. For example, U.S. Pat. No. 1,288,085 issued Dec. 17, 1918, shows a piston ring R from which tongues 2 "possessing a certain degree of inherent resiliency" are struck. These tongues are adapted to contact the bottom wall of the groove to urge the ring R outwardly.

Similarly, U.S. Pat. No. 2,311,557 issued Feb. 16, 1943 to William S. Mason utilizes integral readially resilient means for urging the ring periphery against the wall of the cylinder. In this case spring fingers 11 projecting inwardly of the compression ring to urge it into contact with the cylinder wall.

In accordance with the present invention, there is provided an oil control piston ring of generally annular construction which has a peripheral wall, from the outer face of which projects at least one and preferably two scraping rims and from which are cut a plurality of spring members which project inwardly of the ring from the inner face of the peripheral wall thereof a distance sufficient to engage the bottom wall of the groove within which the ring is disposed in order to bias the ring outwardly sufficiently to engage the scraping rim or rims with the cylinder wall. That is, the spring members or at least a portion thereof define the radially innermost portion of the ring. When two scraping rims are employed they are axially spaced from each other and preferably have flat scraping faces.

In accordance with one aspect of the present invention there is provided a one-piece, annular oil control ring assembly of generally U-shaped cross section defined by a peripheral wall from which two sidewalls extend radially inwardly of the ring, and which has at least one and preferably two scraping rims which project radially outwardly of the peripheral wall, a plurality of spring members cut from the peripheral wall and extending from the inner face thereof more radially inwardly of the ring than the innermost peripheries of the sidewalls whereby the spring members can engage the bottom wall of the groove sufficiently so that a radially inwardly acting compression force imposed on the ring will bend the spring members sufficiently to bias the scraping rims radially outwardly.

In accordance with another aspect of the invention, the one-piece oil control ring assembly, i.e., the one-piece oil control ring, is provided with a plurality of debris openings in the peripheral wall thereof. In accordance with a preferred aspect, the debris openings are provided by the cut outs which form the integral spring members.

The oil control ring of the invention is adapted to be received within a peripheral groove in a piston received within a piston cylinder so that the ring spring members bias the ring to urge the scraping rims thereof into contact with the cylinder wall.

The invention may be better understood with respect to the following detailed description of preferred embodiments thereof and with reference to the drawings which form a part thereof, and wherein:

FIG. 1 is a partial view in elevation of the top of a piston of an internal combustion engine, the piston having peripheral grooves formed therein within respective ones of which are disposed piston rings, including a one-piece oil control piston ring assembly in accordance with this invention;

FIG. 2 is an enlarged sectional view taken along the line 2—2 of FIG. 1;

FIG. 3 is a perspective view of a one-piece oil control ring in accordance with the present invention;

FIG. 4 is an enlarged portion of FIG. 2;

FIG. 5 is a section view taken along line 5—5 of FIG. 1;

FIG. 6 is a cross section view similar to that of FIG. 4, but showing only the (uncompressed) ring in an embodiment having hard-facing thereon;

FIG. 7 is a schematic side view of roll form and metal punch equipment which may be employed to make the ring of the invention;

FIG. 7A is an enlarged view showing the circled portion of FIG. 7;

FIG. 8 is a perspective view of a portion of metal strip usuable to make a piston ring in accordance with the present invention; and FIG. 9 is a perspective view of the rolled and stamped metal strip of FIG. 8 showing the condition of the strip in a sequence of steps of making the spring members and debris openings.

Referring to FIGS. 1 and 2, there is shown in partial view a piston 10 in which a plurality of peripheral ring grooves 12, 14 and 16 are formed, extending circumferentially about piston 10. Piston 10 has a peripheral surface 11 and a top surface 13. Ring groove 16 has disposed therein an oil control ring 18 in accordance with the invention. The usual compression rings 20 and 22 are disposed in, respectively, circumferential grooves 12 and 14. Piston 10 is disposed within a cylinder 24 of an internal combustion engine, cylinder 24 having a cylinder wall 26.

A drain passage 28 connects with ring groove 16 as is well known in the art. Reference is made to FIG. 4, which provides an enlarged view of oil control ring 18 disposed within ring groove 16 of FIG. 2, ring 18 being shown therein in section along the lines indicated by 4—4 in FIG. 3. Ring groove 16 is defined by an upper wall 30 and lower wall 32 with the bottom, i.e., radially innermost portion, of groove 16 defined by bottom wall 34. Drain passage 28 extends into a portion of bottom wall 34 as best seen in FIG. 4. Walls 30, 32 extend radially inwardly of peripheral surface 11 of piston 10, to intersect axially extending bottom wall 34.

Referring now to FIGS. 3, 4 and 5, the oil control ring is generally indicated by 18 and is of generally circuler, split annular construction with a radius R and axial height H, and which has in cross section (FIG. 4) generally a U-shape. A pair of opposed sidewalls 36a, 36b project radially inwardly of ring 18 (towards the center thereof) from, respectively, the axially extreme portions, i.e., the axially uppermost and lowermost portions of peripheral wall 38. Sidewalls 36a, 36b terminate in radially inwardly facing sidewall edges 37a, 37b which define the radially innermost peripheries of sidewalls 36a, 36b. A plurality of spring members 40 project radially inwardly of the ring, the spring members 40 being regularly distributed along the circumference of the spring 18. In the embodiment of FIGS. 3, 4, 5 it will be noted that spring members 40 are provided in pairs with enlarged contact portions and facing each other. Each spring member 40 is seen to be somewhat paddle shaped having a stem 42 and an axially wider (with respect to ring 18) foot 44.

In FIGS. 4 and 5, ring 18 is shown in place within groove 16, with spring members 40 bent radially outwardly from their free position by the compressive action exerted between bottom wall 34 of groove 16 and wall 26 of cylinder 24.

FIG. 6 shows in cross section a hard-faced embodiment of control ring 18. Ring 18 in FIG. 6 is otherwise identical to ring 18 of FIGS. 3, 4 and 5 and corresponding parts are numbered identically to those of the FIGS. 3, 4 and 5 embodiment. However, FIG. 6 shows hard faced ring 18 in it uninstalled, uncompressed state. FIG. 3 shows the unfaced embodiment of ring 18 in the same state. FIGS. 4 and 6 show unfaced ring 18 in its installed, compressed state.

Comparing FIGS. 4 and 6, it will be seen that in FIG. 4, spring members 40 are bent radially outwardly from their free state position and compressed between bottom wall 34 and wall 26 of cylinder 24. In FIG. 4 it will be noted that spring members 40 have been bent radially outwardly with respect to the ring to a point where foot 44 of spring members 40 is almost aligned axially with sidewall edges 37a, 37b. FIG. 6 shows that in the free state, spring members 40 project radially inwardly of the ring a considerable distance radially inwardly of sidewall edges 37a, 37b.

In its free state as shown in FIG. 3, spring members 40, or at least the feet 44 thereof, naturally also extend radially inwardly of sidewall edges 37a, 37b.

In both FIGS. 4 and 6, sidewall edges 37a, 37b are radially coincident, i.e., both lie in the same cylindrical plane. Scraping faces 48a, 48b are likewise radially coincident with each other. Sidewalls 36a, 36b and therefore sidewall edges 37a, 37b as well as scraping rims 46a, 46b all extend around the entire circumference of the ring.

A plurality of debris openings 41 are disposed along the circumference of ring 18. In the embodiment illustrated, spring members 40 are cut from those portions of peripheral wall 38 from which debris openings 41 are formed. As will be appreciated by those skilled in the piston ring art, debris openings 41 provide for passage of oil, carbonized residues, etc. therethrough thence through drains 28.

A pair of scraping rims 46a, 46b project from peripheral wall 38 radially outwardly of oil control ring 18. Scraping rims 46a, 46b each have, respectively, a flat scraping face 48a, 48b facing radially outwardly of ring 18 and extending circumferentially around the entire periphery of ring 18.

FIG. 6 shows an embodiment of the ring of the invention wherein both scraping rims 46a, 46b have hard wear coatings 50a, 50b deposited, respectively, thereover. Hard wear coatings 50a, 50b increase wear resistance of scraping faces 48a, 48b against the cylinder wall 26 and may comprise any suitable hard facing material such as chromium, molybdenum or molybdenum alloys to name but a few possibilities. The coatings may be applied by plating from a chemical bath, e.g., electro-deposited chromium, or by plasma or spray gun plating or any other suitable means. Due to the mode of applying hard wear coatings 50a, 50b the coatings usually extend radially inwardly beyond scraping faces 48a, 48b an rims 46a, 46b. It will be understood that such hard facing materials are not always required and the oil control ring of the invention may be made without them.

Oil control piston ring 18 may advantageously be made from a single strip of metal, for example from flat, generally ribbon shaped steel stock such as shown in FIG. 8. A preferred material is 1090 steel stock which is hard enough so that, at least for light duty engines such as gasoline engines for lawn mowers, snow blowers and light vehicles, flat scraping faces 48a, 48b need not be provided with hard wear coatings. Naturally, any other material may be used to make the rings of the invention including a 1050 carbon steel or any other steel or any other suitable metal or material. When a 1050 carbon steel is used, it is advantageously annealed to make it ductile.

Referring to FIG. 8, a sectioned, perspective view of a portion of metal strip 54 is shown. Strip 54 is generally flat and ribbon-shaped having first and second major surfaces 56a, 56b and first and second edges, respectively 58a, 58b. Dotted lines A, B in FIG. 8 indicate a selected longitudinally extending center portion 54b and adjacent edge portions 54a, 54a'. Edge portions 54a, 54a' are of equal width and indicate that portion of strip 54 which is turned over by a suitable rolling operation to form sidewalls 36a, 36b. Central portion 54b of strip 54 is that portion of the strip from which scraping rims 46a, 46b are formed and from which peripheral wall 38 is formed.

Whether hard-faced or not, scraping rims 46a, 46b are advantageously formed by "pleating", i.e., folding a single strip of material so that the fold or pleats close upon themselves as indicated by the fold lines 52a, 52b in FIGS. 4 and 6.

The dimensions shown on FIG. 8 are not necessarily to scale and will vary depending on the particular cross section configuration of the ring desired to be produced.

Oil control ring 18 is preferably made by a rolling operation in which a series of roll stands 60, 62, 64, of which only three are shown in FIG. 7, are employed. Each roll stand contains a set of vertical and/or horizontal opposed roll forms which are profiled to define a metal working space between them at the region of tangential confluence of the opposed rolls. Each roll stand essentially comprises a pair of opposed vertical uprights 60a and 60b, 62a and 62b, and 64a and 64b. The uprights 60a, 62a and 64a, shown in the foreground of FIG. 7, have been partially broken away to better show their respectively associated profile rolls 60c, 62c and 64c. Strip 54 is unwound from a coil 55 of strip material in the direction shown by the arrows S in FIG. 7. Rolls 60c, 62c and 64c turn in the directions indicated by the small curved arrows in FIG. 7.

Metal strip 54 is progressively deformed when passing through the sequence of metal work spaces between the roll forms. Metal strip 54 is bent into a U-shaped configuration, to define the sidewalls and central peripheral wall, and one or more pleats are formed in the peripheral wall to define scraping rims 46a, 46b. The pleats are closed together about fold lines 52a, 52b (FIG. 4).

After emerging from the last roll stand 64, metal strip 54 has been formed and folded to form a U-shaped cross section strip 54.1 as shown in FIG. 9. Moving in the direction shown by the arrows S, strip 54.1 moves to a punch die 66 in which a series of punches and anvils 68a, 68b carry out a sequence of punching and bending operations.

FIG. 9 illustrates the sequence of punching and bending. Initially, paired U-shape cuts 70 are cut in peripheral wall 38. These are followed by shallow U-shaped cuts 71 which remove or punch out generally rectangular pieces of peripheral wall 30 and are longitudinally shorter than cuts 70 to define stem 42 and foot 44 of each spring member 40. In the same or subsequent step, spring members 40 are deflected downwardly as viewed in FIG. 7 to permanently deform spring members 40 sufficiently far downwardly so that at least a portion of foot 44 thereof extends below sidewall edges 37a, 37b of sidewalls 36a, 36b. See also FIG. 7A. Debris openings 41 are thus formed. The material selected for strip 54, and the method of rolling, punching and heat treatment thereof provide that spring members 40 cut from peripheral wall 38 have a strong, resilient spring action which resists the bending back of spring members 40 into their original position as a portion of peripheral wall 38. The rolled and punched segment of U-shaped cross section strip is indicated at 54.2 in FIGS. 7 and 9.

The profiled, punched strip emerging from punch 66 may thereafter be coiled, heat treated as necessary and the coil of strip cut longitudinally to form a plurality of gapped, cut oil control rings 18.

While manufacture of the ring by rolling from a strip of metal is preferred, it will be appreciated that it is not necessary in that the oil control piston ring of the invention may be made in any suitable manner.

In use, as best seen with reference to FIGS. 1, 2 and 4, the gapped ring 18 is emplaced about a piston 10 and disposed within peripheral ring grooves 16 thereof. Foot 44 engages the bottom wall 34 of ring groove 16 and the respective sizes of the ring and piston groove 16 are selected so that with the piston fitted within its cylinder the engagement of flat scraping faces 46a, 46b with cylinder wall 26 compresses spring member 40 by the engagement of foot 44 against the bottom wall 34 of groove 16. The spring bias of spring member 40 urges ring 18 outwardly to maintain flat scraping faces 46a, 46b in bearing engagement with cylinder walls 26.

As best seen in FIG. 4, the pleats from which scraping rims 46a, 46b are made are closed on themselves for substantially the entire length thereof to form a generally rigid, solid, multi-layered rims 46a, 46b. By "multilayer" it is meant that the total rim thickness (measured vertically in FIG. 4) is formed effectively of a double layer of the original strip 54 for at least a portion of the depth by which scraping rims 46a, 46b extend from peripheral wall 38.

The amount of compression of spring member 40 is sufficient so that even after flat scraping faces 48a, 48b sustain some wear sufficient outward biasing is provided by spring members 40 to maintain the worn scraping faces 48a, 48b in good scraping contact with cylinder wall 26. As best seen in FIG. 3, oil control ring 18 of the invention is generally circular in shape. It will be appreciated by those skilled in the art that in the free condition shown in FIG. 3, ring 18 is actually made out of circle and, when compressed by cylinder wall 26 within groove 16, will attain a more nearly perfectly circular configuration with a resultant compression of the ring to narrow gap 44 (FIG. 3) to a smaller or even closed dimension 44' (FIG. 1 and FIG. 5).

The material removed adjacent stem 42, and the material which forms stem 42 and foot 44, by virtue of the latter two being bent out of the plane of peripheral wall 38, provides a debris or vent opening 41 which, as will be appreciated by those skilled in the art, provides for the passage of debris, oil, etc., through ring 18 and debris passage 28 in piston 10.

As seen by considering FIGS. 9 and 4 in conjunction, spring members 40 are provided with a foot 44 whose axial (relative to ring 18) width (measured vertically in FIG. 4) corresponds essentially to that axial width of peripheral wall 38 which is axially between and clear of the axial extent of scraping rims 46a, 46b. That is, a portion at least of spring member 40, e.g., foot 44, is made axially as wide as possible without cutting the material from scraping rims 46a, 46b. This is referred to in the claims as making a portion of the spring members axially as wide as the width of the peripheral wall between the scraping rims. This provides a more stable, wide bearing contact of foot 44 of spring members 40 with the bottom wall of groove 16, and further provides a relatively large debris opening 41 at least along that portion thereof coextensive with foot 44. The effectiveness of the debris opening 41 is also enhanced by cutting stem 42 of spring member 40 to be axially narrower than foot 44 to help provide clearance for debris passing through debris openings 41.

As best seen in FIG. 5, spring members 40 preferably are bent about a first axial axis $r_1$ to turn spring member 40 radially inwardly of ring 18, and also bent about a second axial axis $r_2$ in a radially outwardly direction so that at least a portion of foot 44 is turned to seat more nearly tangentially, or tangentially, on the bottom wall 34 of ring groove 16. This gives spring members 40 a generally S-shaped configuration.

Thus, spring member 40 preferably is bent from peripheral wall 38 in at least two distinct places. The first bend is about an axis indicated by $r_1$ which preferably is generally parallel to the longitudinal, i.e., vertical axis of ring 18. This bend has a curvature whose concave side faces the same direction as the concave curvature of ring 18. A second bend is about an axis indicated by $r_2$ which is also generally parallel to the axial direction of ring 18. This bend's concave curvature faces the opposite direction of the concave radius of curvature of ring 18. That is, the concave side of the curvature about $r_1$ faces radially inwardly of ring 18 and the concave side of the curvature $r_2$ faces radially outwardly of ring 18. The axis of bending $r_1$ is closer to peripheral wall 38 than the axis of bending $r_2$. That is, the axis $r_1$ is at or adjacent the base of stem 42, i.e., at that portion of stem 42 which is at or adjacent to peripheral wall 38. The axis $r_2$ is preferably located distally remote from the base of stem 42, and preferably at or adjacent the portion of spring member 40 where stem 42 merges into foot 44.

The invention has been described in detail with reference to specific preferred embodiments thereof. However, upon a reading and understanding of the foregoing, numerous alterations and modifications to the preferred embodiments will occur to those skilled in the art. It is intended to include all such modifications and alterations within the scope of the appended claims.

Although in the previous description the wall 38 has been referred to as a "peripheral wall 38", it will be seen that this portion of the ring is located intermediate the sidewalls 36a and 36b and may thus be identified equally well as "intermediate wall 38".

What is claimed is:

1. A one piece oil control piston ring for location in a groove of a piston which moves in a cylinder bore of an internal combustion engine, said oil control piston ring comprising a steel strip having a split annular shape, and having a generally U-shaped cross-sectional configuration said strip including a pair of sidewall portions and an intermediate wall portion forming an inwardly opening channel, said ring having at its outer periphery a cylindrical surface for oil scraping engagement with said cylinder bore to control the thickness of the oil film on the cylinder wall, said cylindrical surface being located at the apex of first and second radially outwardly extending portions of said strip extending from said intermediate wall portion and forming an oil scraping rim, said first and second portions having confronting surfaces which abut for at least part of the radial extent of said first and second portions, said sidewall portions extending radially inwardly relative to said intermediate wall, said sidewalls each terminating in respective, radially inwardly facing sidewall edges; said steel strip having a plurality of resilient spring members disposed about the circumference of said ring and radially inwardly displaced out of the surface of said intermediate wall, the spring members extending radially inwardly of the sidewall edges whereby said spring members are positioned for engagement with the bottom of the groove in said piston, said ring having debris openings through the intermediate wall formed at least in part by the displacement of those portions of the intermediate wall by which the spring members are formed.

2. The ring of claim 1 wherein a pair of scraping rims are formed on the intermediate wall and are axially spaced one from the other,
    the sidewall edges define the radially innermost portions of their respective sidewalls,
    the spring members extend from the portion of the intermediate wall between the scraping rims, and
    a plurality of debris openings are formed in the intermediate wall between the scraping rims.

3. The ring of claim 2 wherein at least a portion of the spring members are axially as wide as the width of the intermediate wall between the scraping rims.

4. The ring of claim 3 wherein the spring member has a stem portion extending from the intermediate wall and a foot portion at the distal end of the spring member, the foot portion being axially as wide as the width of the intermediate wall between the scraping rims.

5. The ring of claim 2 wherein the ring is a rolled steel ring having its scraping rim formed by a pleat which is closed on itself to form a multi-layered rim.

6. The ring of claim 1 wherein the spring members have an S-shape form by the spring members having: a first bend adjacent the intermediate wall which bend is formed about an axially extending axis and has a concave curvature facing radially inwardly of the ring, and a second bend distally removed from the intermediate wall which second bend is formed about an axially extending axis and has a concave curvature facing radially outwardly of the ring.

7. The ring of claim 1 wherein the cylindrical surface has a hard facing coating thereon.

8. The ring of claim 2 in combination with a piston disposed within a cylinder of an internal combustion engine, the piston having a peripheral groove formed in the periphery thereof which groove includes a bottom wall which extends axially relative to the ring, the ring being disposed in the groove with the scraping rim contacting the cylinder and the spring members seated on the bottom wall of the groove and bent in a radially outward direction by compression of the spring members between the bottom wall of the groove and the cylinder, whereby the spring members bias the ring outwardly of the groove so that the scraping rims project radially outwardly beyond the periphery of the piston and are maintained in engagement with the cylinder.

9. A one-piece oil control ring of split annular shape comprising an intermediate wall extending between a pair of opposed sidewalls which extend radially inwardly relative to said wall, the sidewalls each extending along the entire circumference of the ring and terminating radially in respective inwardly facing sidewall edges, the respective sidewall edges being axially coincident with each other to define the radially innermost portions of the sidewalls, a pair of axially spaced scraping rims formed on said intermediate wall and extending radially outwardly thereof and terminating in respective axially outwardly facing scraping faces, the respective scraping faces being axially coincident and defining the radially outermost periphery of the ring and extending along the entire circumference thereof, a plurality of resilient spring members displaced out of the surface of said wall and regularly disposed about the entire circumference of the ring, the spring members respectively extending from the intermediate wall radially inwardly of the ring and extending radially inwardly of the sidewall edges, and a plurality of debris openings in the intermediate wall, formed at least in part from those portions of the intermediate wall from which the spring members are cut.

10. The ring of claim 9 wherein the ring is a rolled steel ring having multi-layered scraping rims formed by pleats rolled in the ring and closed on themselves, and the scraping rims have flat scraping faces.

11. The ring of claim 9 wherein the spring members have a generally S-shaped configuration.

* * * * *